(12) United States Patent
Kakarala et al.

(10) Patent No.: US 9,052,759 B2
(45) Date of Patent: Jun. 9, 2015

(54) DYNAMICALLY RECONFIGURABLE PIXEL ARRAY FOR OPTICAL NAVIGATION

(75) Inventors: Ramakrishna Kakarala, Santa Clara, CA (US); Annette C. Grot, Cupertino, CA (US); David W. Dolfi, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1479 days.

(21) Appl. No.: 11/734,244

(22) Filed: Apr. 11, 2007

(65) Prior Publication Data

US 2008/0252602 A1    Oct. 16, 2008

(51) Int. Cl.
*G09G 5/08*    (2006.01)
*G06F 3/038*   (2013.01)
*G06F 3/03*    (2006.01)
*G06F 3/0354*  (2013.01)

(52) U.S. Cl.
CPC ............ *G06F 3/0383* (2013.01); *G06F 3/0317* (2013.01); *G06F 3/03543* (2013.01)

(58) Field of Classification Search
CPC .. G06F 3/0383; G06F 3/0317; G06F 3/03543
USPC .......................... 345/156, 163, 166; 382/313
See application file for complete search history.

(56) References Cited

U.S. PATENT DOCUMENTS

| | | |
|---|---|---|
| 4,631,400 A | 12/1986 | Tanner et al. |
| 5,644,139 A | 7/1997 | Allen et al. |
| 6,078,312 A | 6/2000 | Liebenow |
| 6,222,174 B1 | 4/2001 | Tullis et al. |
| 6,281,882 B1 | 8/2001 | Gordon et al. |
| 6,433,780 B1 | 8/2002 | Gordon |
| 6,462,330 B1 | 10/2002 | Venkat et al. |

(Continued)

FOREIGN PATENT DOCUMENTS

| | | |
|---|---|---|
| DE | 69808522 | 8/2003 |
| DE | 102005004861 | 10/2005 |

(Continued)

OTHER PUBLICATIONS

Burns, Ryan D.; "Improved Techniques for Object Location with CMOS Image Sensors"; Master Thesis, Waterloo, Ontario, Canada; 88 pgs.; 2003.

(Continued)

*Primary Examiner* — Amare Mengistu
*Assistant Examiner* — Jennifer Zubajlo

(57) ABSTRACT

Embodiments of an apparatus are described. In one embodiment, the apparatus is an optical navigation circuit. In particular, the optical navigation circuit may be part of an optical navigation device. The optical navigation circuit includes an image sensor, dynamic reconfiguration logic, and a digital signal processor. The image sensor includes a pixel array to generate a plurality of electrical signals corresponding to incident light at the pixel array. The dynamic reconfiguration logic is coupled to the image sensor. The dynamic reconfiguration logic is configured to receive the plurality of electrical signals from the pixel array and to generate a plurality of reconfigured electrical signals based on the plurality of electrical signals from the pixel array. The digital signal processor is coupled to the dynamic reconfiguration logic. The digital signal processor is configured to receive the plurality of reconfigured electrical signals from the dynamic reconfiguration logic.

23 Claims, 7 Drawing Sheets

(56) References Cited

U.S. PATENT DOCUMENTS

| | | |
|---|---|---|
| 6,466,265 B1 | 10/2002 | Lee et al. |
| 6,888,568 B1 | 5/2005 | Neter |
| 7,339,575 B2 | 3/2008 | Tai |
| 7,399,953 B2 | 7/2008 | Xie et al. |
| 7,446,756 B2 | 11/2008 | Brosnan et al. |
| 7,515,183 B2 | 4/2009 | Yang et al. |
| 2002/0080121 A1 | 6/2002 | Son |
| 2003/0193529 A1 | 10/2003 | Lee |
| 2004/0189593 A1 | 9/2004 | Koay |
| 2005/0060668 A9 | 3/2005 | Lee et al. |
| 2005/0078087 A1* | 4/2005 | Gates et al. ............ 345/163 |
| 2005/0094154 A1 | 5/2005 | Baney et al. |
| 2005/0231479 A1* | 10/2005 | Xie et al. ............. 345/163 |
| 2005/0264531 A1* | 12/2005 | Tai et al. ............. 345/163 |
| 2006/0086712 A1 | 4/2006 | Feldmeier |
| 2006/0140451 A1 | 6/2006 | Cheng et al. |
| 2006/0146023 A1 | 7/2006 | Kidron et al. |
| 2006/0187208 A1 | 8/2006 | Wenstrand et al. |
| 2006/0266934 A1 | 11/2006 | Lye Hock et al. |
| 2007/0296699 A1* | 12/2007 | Bohn et al. ............ 345/166 |
| 2008/0061219 A1 | 3/2008 | Lee et al. |

FOREIGN PATENT DOCUMENTS

| | | |
|---|---|---|
| DE | 102005004861 A1 | 10/2005 |
| EP | 1659778 | 5/2006 |
| EP | 1659778 A1 | 5/2006 |
| TW | 200627251 | 10/1994 |
| TW | 200622909 | 7/2006 |
| TW | 200627251 | 8/2006 |

OTHER PUBLICATIONS

Zhou, Zhimin et al.; "Frame-Transfer CMOS Active Pixel Sensor with Pixel Binning"; IEEE Transactions on Electron Devices, vol. 44, No. 10; pp. 1764-.

Burns; "Improved Techniques for Object Location with CMOS Image Sensors"; A thesis presented to University of Waterloo; 88 pages; 2003.

Zhou, Zhimin et al.; "Frame-Transfer CMOS Active Pixel Sensor with Pixel Binning"; IEEE Transactions on Electron Devices, vol. 44, No. 10; pp. 1764-1768; Oct. 10, 1997.

* cited by examiner

DYNAMICALLY RECONFIGURABLE PIXEL ARRAY FOR OPTICAL NAVIGATION

BACKGROUND OF THE INVENTION

Conventional optical navigation sensors use a pixel array with uniformly sized pixels to obtain digital images for computing motion. However, there is no optimal pixel size for resolving the features of all types of surfaces or imaged scenes.

For optical mouse sensors, a typical imaged scene is a surface such as a desktop or a mouse pad. Since there are several types of surfaces, different pixel arrays perform differently on each type of surface. For example, larger pixel sizes allow for greater light sensitivity for operation on dark surfaces. Larger pixel sizes are not optimal, though, for surfaces with small features because pixel arrays with larger pixel sizes do not have the proper resolution for such surfaces. As another example, some highly repetitive surfaces such as halftones can cause tracking errors if the pixel pitch is such that motion cannot be distinguished from the repetition of the pattern.

Thus, conventional optical navigation sensors do not easily adapt to different types of scenes imaged for computing motion. In particular, the characteristics of the conventional pixel arrays are fixed and do not provide optimal functionality with a variety of imaged scenes.

SUMMARY OF THE INVENTION

Embodiments of an apparatus are described. In one embodiment, the apparatus is an optical navigation circuit. In particular, the optical navigation circuit may be part of an optical navigation device. The optical navigation circuit includes an image sensor, dynamic reconfiguration logic, and a digital signal processor. The image sensor includes a pixel array to generate a plurality of electrical signals corresponding to incident light at the pixel array. The dynamic reconfiguration logic is coupled to the image sensor. The dynamic reconfiguration logic is configured to receive the plurality of electrical signals from the pixel array and to generate a plurality of reconfigured electrical signals based on the plurality of electrical signals from the pixel array. The digital signal processor is coupled to the dynamic reconfiguration logic. The digital signal processor is configured to receive the plurality of reconfigured electrical signals from the dynamic reconfiguration logic.

Another embodiment of the apparatus is also described. The apparatus includes means for generating a dynamic reconfiguration trigger based on an analysis of a plurality of electrical signals from a pixel array of an optical navigational device. The apparatus also includes means for generating a plurality of reconfigured electrical signals in response to the dynamic reconfiguration trigger. In one embodiment, the plurality of reconfigured electrical signals is based on the plurality of electrical signals from the pixel array. The apparatus also includes means for processing the reconfigured electrical signals to identify a movement of the optical navigation device. Other embodiments of the apparatus are also described.

Embodiments of a method are also described. In one embodiment, the method is a dynamic reconfiguration method for a pixel array of an optical navigation device. The dynamic reconfiguration method includes receiving incident light at the pixel array to generate a plurality of electrical signals. The dynamic reconfiguration method also includes analyzing the plurality of electrical signals to determine whether to generate a dynamic reconfiguration trigger. The dynamic reconfiguration method also includes generating a plurality of reconfigured electrical signals in response to generation of the dynamic reconfiguration trigger. In one embodiment, the plurality of reconfigured electrical signals is based on the plurality of electrical signals from the pixel array. The dynamic reconfiguration method also includes processing the reconfigured electrical signals to identify a movement of the optical navigation device. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
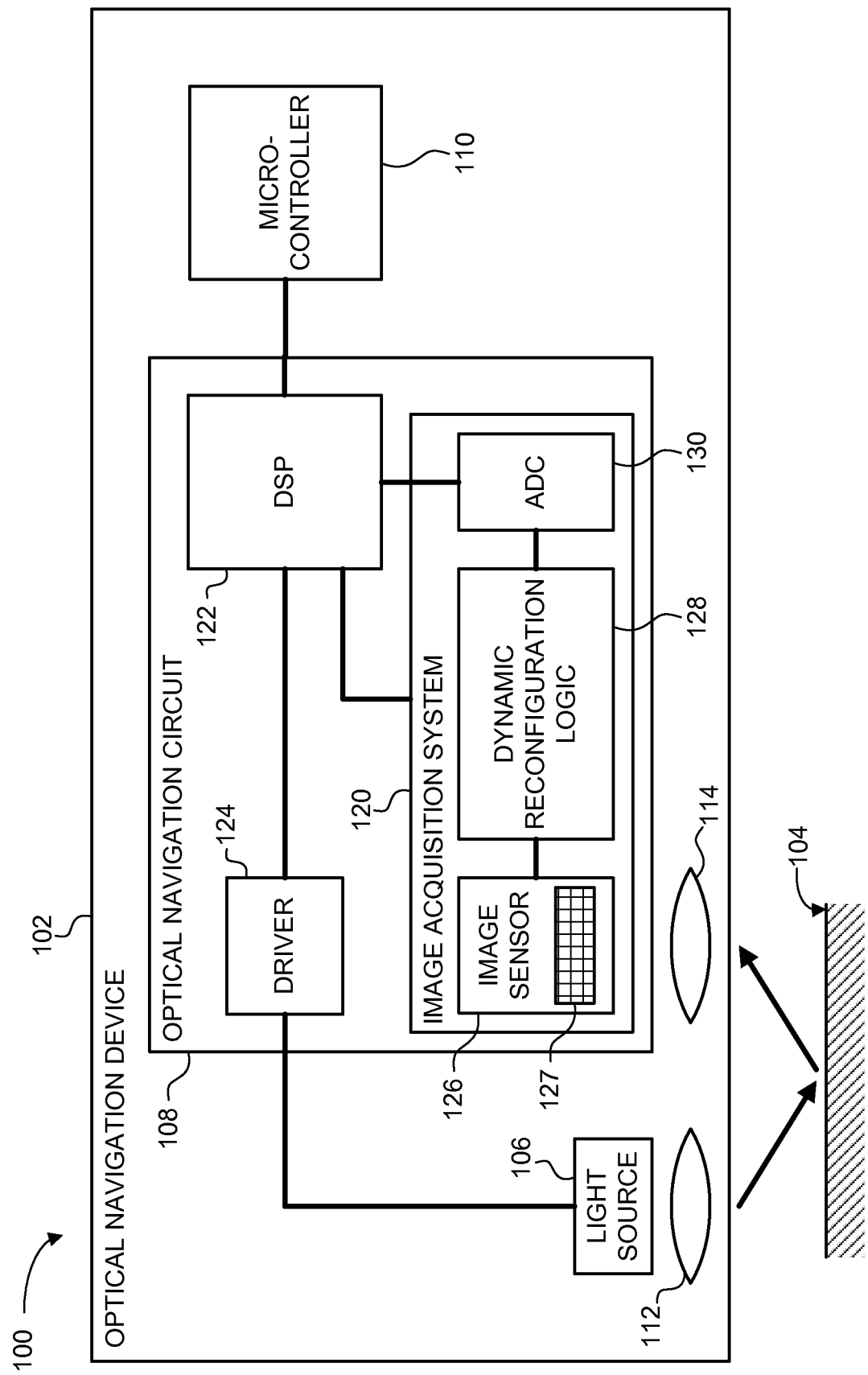
FIG. 1 depicts a schematic block diagram of one embodiment of an optical navigation system.

FIG. 1 depicts a schematic block diagram of one embodiment of an optical navigation system 100. The illustrated optical navigation system 100 includes an optical navigation device 102 and a navigation surface 104. The optical navigation device 102 emits a light signal which is at least partially reflected by the navigation surface 104. The optical navigation device 102 detects the reflected light signal and processes the reflected light signal, as described below.

It should be noted that the distance between the optical navigation device 102 and the navigation surface 104 may vary depending on the application for which the optical navigation device 102 is used. In near-field applications, the optical navigation device 102 may be relatively close to the navigation surface 104. For example, the optical navigation device 102 may be in physical contact with the navigation surface 104, or the optical navigation device 102 may be within a few centimeters or inches of the navigation surface 104. Alternatively, in far-field applications, the optical navigation device 102 may be relatively far from the navigation surface 104. For example, the optical navigation device 102 may operate outside of the near-field optical range.

The depicted optical navigation device 102 includes a light source 106, an optical navigation circuit 108, a microcontroller 110, and optical elements 112 and 114. Other embodiments may include fewer or more components. For example, some embodiments of the optical navigation device 102 may exclude one or more of the optical elements 112 and 114.

In one embodiment, the light source 106 is a light emitting diode (LED). In another embodiment, the light source 106 is a laser. Alternatively, the light source 106 may be another type of light source.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light signal that is transmitted through the optical element 112 to the navigation surface 104. The reflected light signal is then received through the other optical element 114 and detected by the image acquisition system 120.

The depicted image acquisition system 120 includes an image sensor 126, which includes a pixel array 127. The image acquisition system 120 also includes dynamic reconfiguration logic 128 and an analog-to-digital converter (ADC) 130. The dynamic reconfiguration logic 128 also may be referred to as a dynamic reconfiguration circuit.

In one embodiment, the image sensor 126 generates a plurality of electrical signals corresponding to incident light at the pixel array 127. Each of the electrical signals corresponds to one of the picture elements (or pixels) of the pixel array 127. In one embodiment, each pixel is a photosensor or other photosensitive device. The light signal reflected from the navigation surface 104 is incident on the pixel array 127. In one embodiment, the optical element 114 facilitates resolution of microscopic surface images at the pixel array 127. The image sensor 126 then transmits the plurality of electrical signals to the dynamic reconfiguration logic 128.

In general, the dynamic reconfiguration logic 128 receives the plurality of electrical signals from the pixel array 127 of the image sensor 126 and generates a plurality of reconfigured electrical signals. The reconfigured electrical signals are based on the plurality of electrical signals from the pixel array 127 of the image sensor 126. Exemplary descriptions of various reconfigured electrical signals, and how the reconfigured electrical signals are generated, are provided in more detail below. The dynamic reconfiguration logic 128 then transmits the reconfigured electrical signals to the analog-to-digital converter 130. The analog-to-digital converter 130 converts the plurality of reconfigured electrical signals from analog signals to digital signals and then passes the digital signals to the digital signal processor 122.

After the digital signal processor 122 receives the digital form of the reconfigured electrical signals from the analog-to-digital converter 130 of the image acquisition system 120, the digital signal processor 122 may perform additional processing using the reconfigured electrical signals. The digital signal processor 122 then transmits one or more signals to the microcontroller 110. Exemplary types of signals transmitted from the digital signal processor 122 of the optical navigation circuit 108 to the microcontroller 110 include channel quadrature signals based on Δx and Δy relative displacement values. These signals, or other signals, may be indicative of a movement of the optical navigation device 102 relative to the navigation surface 104. Other embodiments of the digital signal processor 122 may transmit other types of signals to the microcontroller 110. In one embodiment, the microcontroller 110 implements a variety of functions, including transmitting data to and receiving data from a host computer system (not shown).

Figure 2:
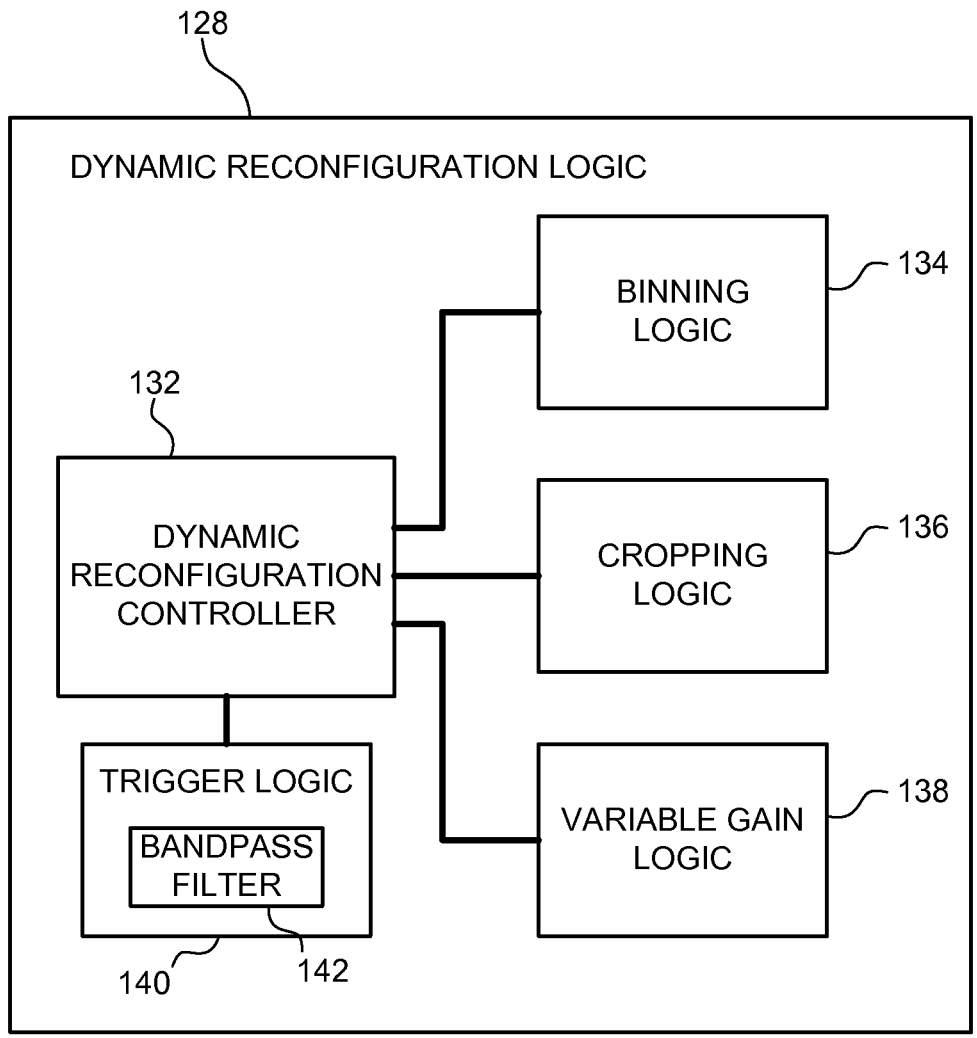
FIG. 2 depicts a schematic block diagram of one embodiment of the dynamic reconfiguration logic of the image acquisition system of FIG. 1.

FIG. 2 depicts a schematic block diagram of one embodiment of the dynamic reconfiguration logic 128 of the image acquisition system 120 of FIG. 1. The illustrated dynamic reconfiguration logic 128 includes a dynamic reconfiguration controller 132, binning logic 134, cropping logic 136, and variable gain logic 138. The dynamic reconfiguration logic 128 also includes trigger logic 140. Alternatively, other embodiments of the dynamic reconfiguration logic 128 may exclude the trigger logic 140.

In one embodiment, the dynamic reconfiguration controller 132 is configured to implement a dynamic reconfiguration mode. In general, a dynamic reconfiguration mode refers to any mode of operation of the dynamic reconfiguration logic 128 in which the plurality of electrical signals are received from the image sensor 126 and a plurality of reconfigured electrical signals are generated based on the original electrical signals from the image sensor 126. Some examples of dynamic reconfiguration modes which may be implemented by the dynamic reconfiguration controller 132 include a binning mode, a cropping mode, and a variable gain mode. Some embodiments of the dynamic reconfiguration controller 132 may implement other types of dynamic reconfiguration modes. Additionally, some embodiments may implement a combination of dynamic reconfiguration modes.

In one embodiment, the dynamic reconfiguration controller 132 implements a dynamic reconfiguration mode in response to a dynamic reconfiguration trigger. In other words, the dynamic reconfiguration controller 132 generates the reconfigured electrical signals in response to a dynamic reconfiguration trigger. In one embodiment, the trigger logic 140 of the dynamic reconfiguration logic 128 generates the dynamic reconfiguration trigger. Alternatively, the dynamic reconfiguration trigger may be generated by the digital signal processor 122. In this embodiment, the digital signal processor 122 sends the dynamic reconfiguration trigger to the dynamic reconfiguration logic 128 of the image acquisition system 120.

In one embodiment, the dynamic reconfiguration trigger is a binning trigger. The binning trigger may be generated based on one or more indicators. Exemplary indicators for generating the binning trigger include a first pixel statistics indicator associated with a pixel mean, a second pixel statistics indicator associated with a pixel maximum, a third pixel statistics indicator associated with a pixel histogram, a smoothness indicator to indicate motion tracking smoothness of the optical navigation device, and an image autocorrelation indicator to indicate a pattern repetition of a surface such as the navigation surface 104. Some embodiments of the trigger logic 140 may use other indicators or combinations of indicators.

In another embodiment, the dynamic reconfiguration trigger is a cropping trigger. The cropping trigger may be based on one or more indicators. Exemplary indicators for generating the cropping trigger include a time indicator to indicate a processing time of a motion computation, a smoothness indicator to indicate motion tracking smoothness of the optical navigation device, and an image autocorrelation indicator to indicate a pattern repetition of a surface such as the navigation surface 104.

In another embodiment, the dynamic reconfiguration trigger is a variable gain trigger. The variable gain trigger may be generated based on one or more indicators. Exemplary indicators for generating the variable gain trigger include a first pixel statistics indicator associated with a pixel mean, a second pixel statistics indicator associated with a pixel maximum, a third pixel statistics indicator associated with a pixel histogram, and an image feature indicator to indicate an image feature count of an image received by the pixel array 127. In one embodiment, the trigger logic 140 implements a bandpass filter 142 to generate the image feature indicator.

Alternatively, the bandpass filter 142 may be implemented by the digital signal processor 122 or another component in the optical navigation circuit 108. In another embodiment, separate bandpass filters 142 may be implemented in each of the trigger logic 140 and the digital signal processor 122. Each bandpass filter 142 may have unique filter characteristics tailored to the separate operations of triggering and navigation.

One exemplary embodiment of a bandpass filter 142 is generated by convolving a highpass filter with a low pass filter. A suitable highpass filter is a Laplacian filter, which is commonly represented as a 3×3 matrix, with the following coefficients:

$$L = \begin{bmatrix} -1 & -2 & -1 \\ -2 & 12 & -2 \\ -1 & -2 & -1 \end{bmatrix}$$

A suitable low pass filter is the following 2×2 summing matrix:

$$S = \begin{bmatrix} 1 & 1 \\ 1 & 1 \end{bmatrix}$$

The bandpass filter 142 resulting from convolving the matrices L and S is represented by the following 4×4 matrix:

$$\begin{bmatrix} -1 & -3 & -3 & -1 \\ -3 & 7 & 7 & -3 \\ -3 & 7 & 7 & -3 \\ -1 & -3 & -3 & -1 \end{bmatrix}$$

Alternatively, other bandpass filters 142 may be implemented.

The dynamic reconfiguration controller 132 invokes different dynamic reconfiguration modes depending on the type of dynamic reconfiguration trigger generated by the trigger logic 140. Each of the dynamic reconfiguration modes may use a specific type of logic. For example the binning mode 134 uses the binning logic 134, the cropping mode uses the cropping logic 136, and the variable gain mode uses the variable gain logic 138. Each of these dynamic reconfiguration modes is described in more detail with reference to FIGS. 3-8.

Figure 3:
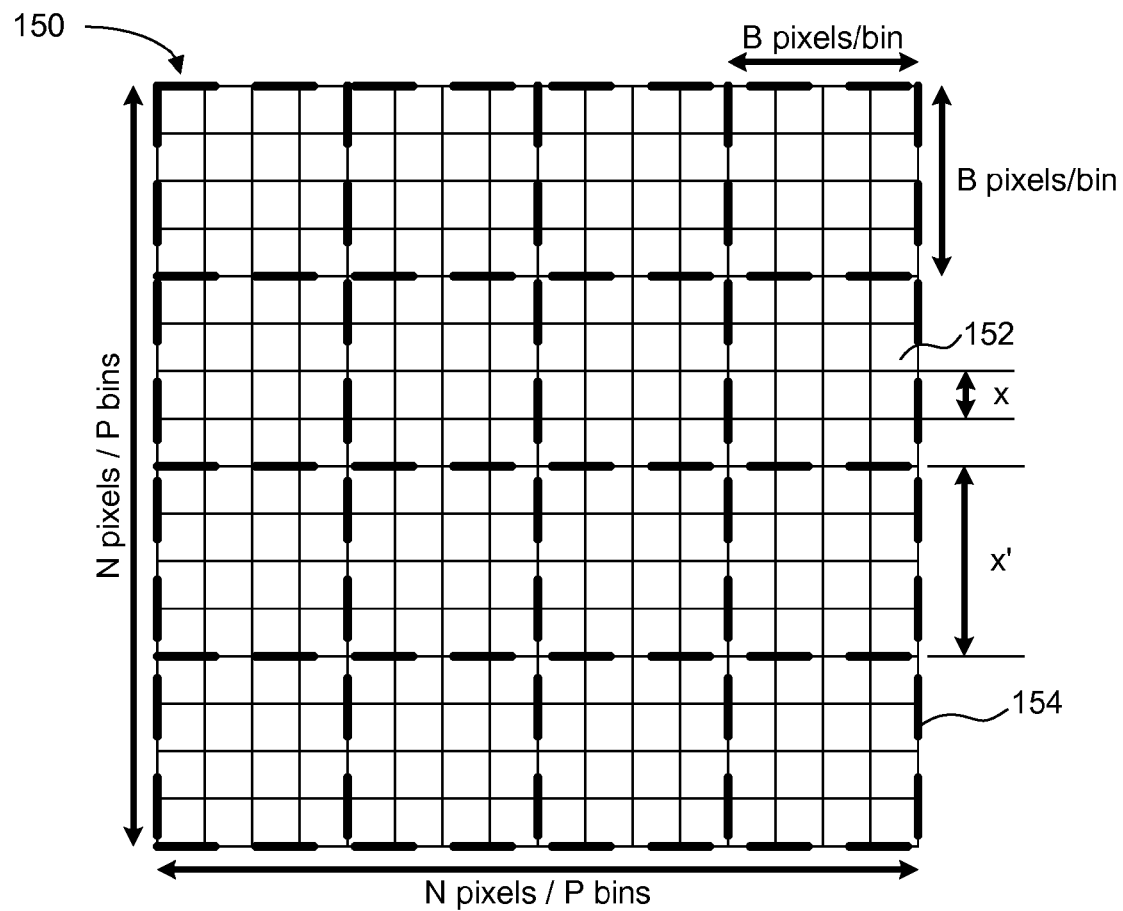
FIG. 3 depicts a schematic diagram of one embodiment of a pixel array to show binning.
Figure 4:
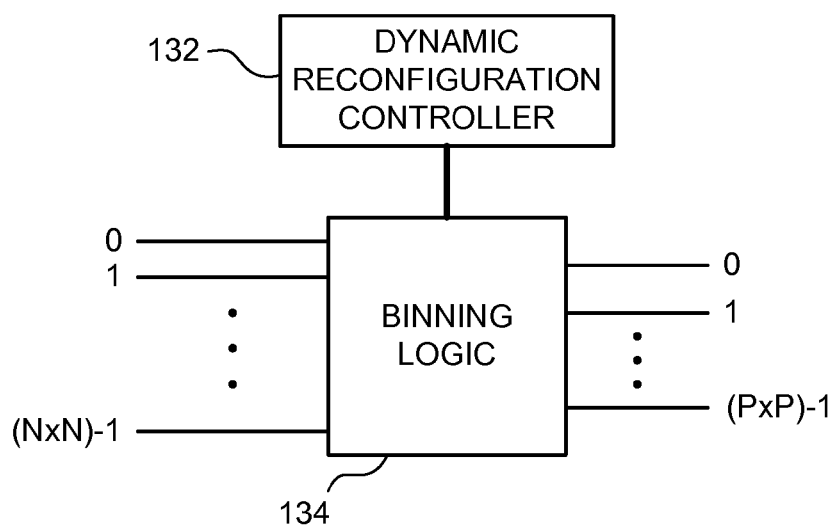
FIG. 4 depicts a schematic block diagram of one embodiment of a pixel binning architecture.

FIGS. 3 and 4 illustrate aspects of the binning mode. In one embodiment, the binning logic 134 is configured to combine subsets of the plurality of electrical signals to generate the plurality of reconfigured electrical signals. Thus, the number of reconfigured electrical signals is equal to the number of subsets. In other words, the binning logic 134 generates a reconfigured electrical signal that is based on multiple electrical signals from a subset, or group, of pixels in the pixel array 127.

FIG. 3 depicts a schematic diagram of one embodiment of a pixel array 150 to show binning. In the illustrated embodiment, the N×N pixel array 150 is subdivided into sixteen bins 154, or groups of pixels 152. Each bin 154 includes a B×B array of pixels 152. Therefore, the resulting bin array is a P×P array of bins 154. The electrical signals of the individual pixels 152 within a bin 154 are combined so that each bin 154 has one corresponding reconfigured electrical signal. For example, may be sixteen bins 154 in a 4×4 bin array (i.e., P=4), with each bin 154 including a 4×4 pixel array (i.e., B=4). B is also referred to as the binning factor because it designates how many pixels 152 are in each bin 154. Since there are sixteen bins 154 in the illustrated embodiment, the binning logic 134 generates sixteen corresponding reconfigured electrical signals (e.g., one reconfigured electrical signal for each of the sixteen bins 154) for the pixel array 150, instead of 256 original electrical signals (e.g., one for each pixel 152).

FIG. 4 depicts a schematic block diagram of one embodiment of a pixel binning architecture. The dynamic reconfiguration controller 132 is coupled to the binning logic 134 to control the implementation of the binning mode. The binning logic 134 receives N×N electrical signals, where N×N represents the number of pixels 152 in the pixel array 150. The binning logic 134 then combines the N×N electrical signals to generate P×P reconfigured electrical signals, where P×P represents the number of bins 154 (because there is one reconfigured electrical signal for each bin 154).

It should be noted that the binning mode may reduce the complexity of processing because there are fewer reconfigured electrical signals (e.g., 16) than the number of original electrical signals (e.g., 256). Additionally, the binning mode may be used on relatively dark navigation surfaces 104 to effectively produce a larger, more sensitive response. When the navigation surface 104 is dark, the electrical signals produced by the image sensor 126 are relatively weak due to the limited amount of light reflected from the dark navigation surface 104. Thus, combining multiple electrical signals together into a reconfigured electrical signal increases the strength of the signal and the sensitivity of the image sensor. Additionally, combining the electrical signals of multiple pixels 152 increases the effective pitch, or pixel size, of the image sensor 126. For example, the effective pitch of the pixel array 150 may be increased from the original pixel pitch, x, to a larger pixel pitch, x'. When the optical navigation device 102 is used on a brighter, more reflective navigation surface 104, the binning mode may be disabled so that the original electrical signals from the individual pixels 152 may be used to allow resolution of smaller features.

In order to illustrate the operation of the binning mode more thoroughly, the following examples are provided. These examples show how binning can be turned on and off. These examples also show how the binning factor can be dynamically adjusted when the binning mode is implemented.

In one example, an image resolved by the image sensor 126 may be too dark when the binning mode is off. This can be detected by determining that the maximum pixel value and the mean pixel value for the image are below a threshold, and the integration time is set at a maximum. Since integration time cannot be increased, in this example, the binning mode may be initiated, or turned on, to effectively increase the pixel pitch of the pixel array 127. In one embodiment, the binning factor, B, is set to be dependent on a ratio of the target mean pixel value and the actual mean pixel value (e.g., B=target/actual).

In another example, an image has too few detectable features when the binning mode is operational. In other words, the image sensor 126 cannot resolve small features of the navigation surface 104, for example, because the effective size of the pixel bins 154 is too large and the bins 154 are averaging out the small features when binning is on. This can be detected if the output of a bandpass filter is below a threshold, and if autocorrelation (e.g., after mean removal) is below a threshold. In order to address this issue, binning can be turned off.

In another example, autocorrelation may show closely spaced secondary peaks when binning is turned on. This indicates that the image has a repetitive pattern that is periodic near the effective pixel pitch. To address this issue, the binning factor, B, can be reduced. In one embodiment, the binning factor is reduced by an amount corresponding to the ratio of the target peak spacing and the actual peak spacing (e.g., B'=B*target/actual). Alternatively, the binning factor may be increased or reduced by another amount.

In another embodiment, the detected velocity of the optical navigation device 102 may be increasing when binning is turned off. This can be detected, for example, by measuring pixel displacement from the last frame by cross-correlation. To address this issue, the binning factor, B, may be increased. In one embodiment, the binning factor is increased by an amount corresponding to the ratio of the target tracking velocity and the current maximum velocity (e.g., B'=B*target/current max). Alternatively, the binning factor may be increased or reduced by another amount.

Figure 5:
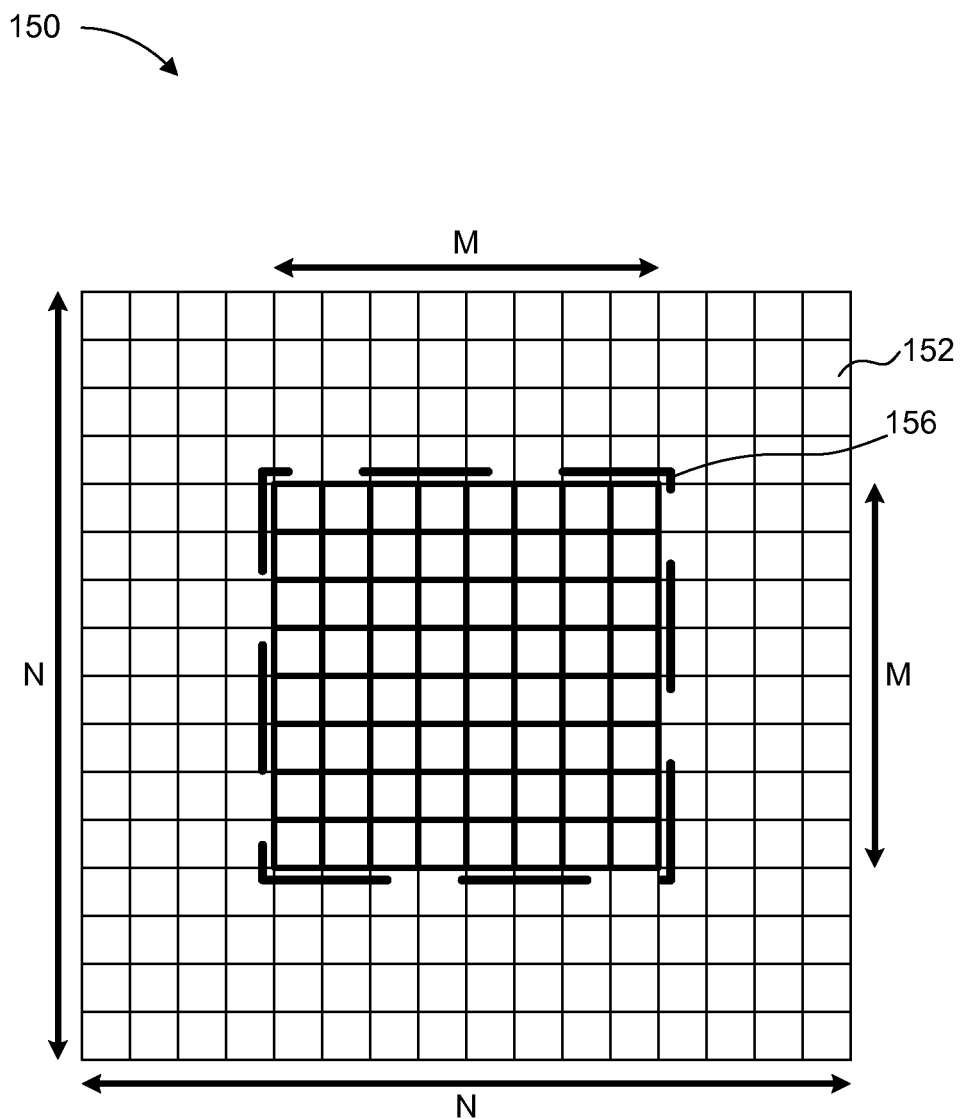
FIG. 5 depicts a schematic diagram of one embodiment of a pixel array to show cropping.
Figure 6:
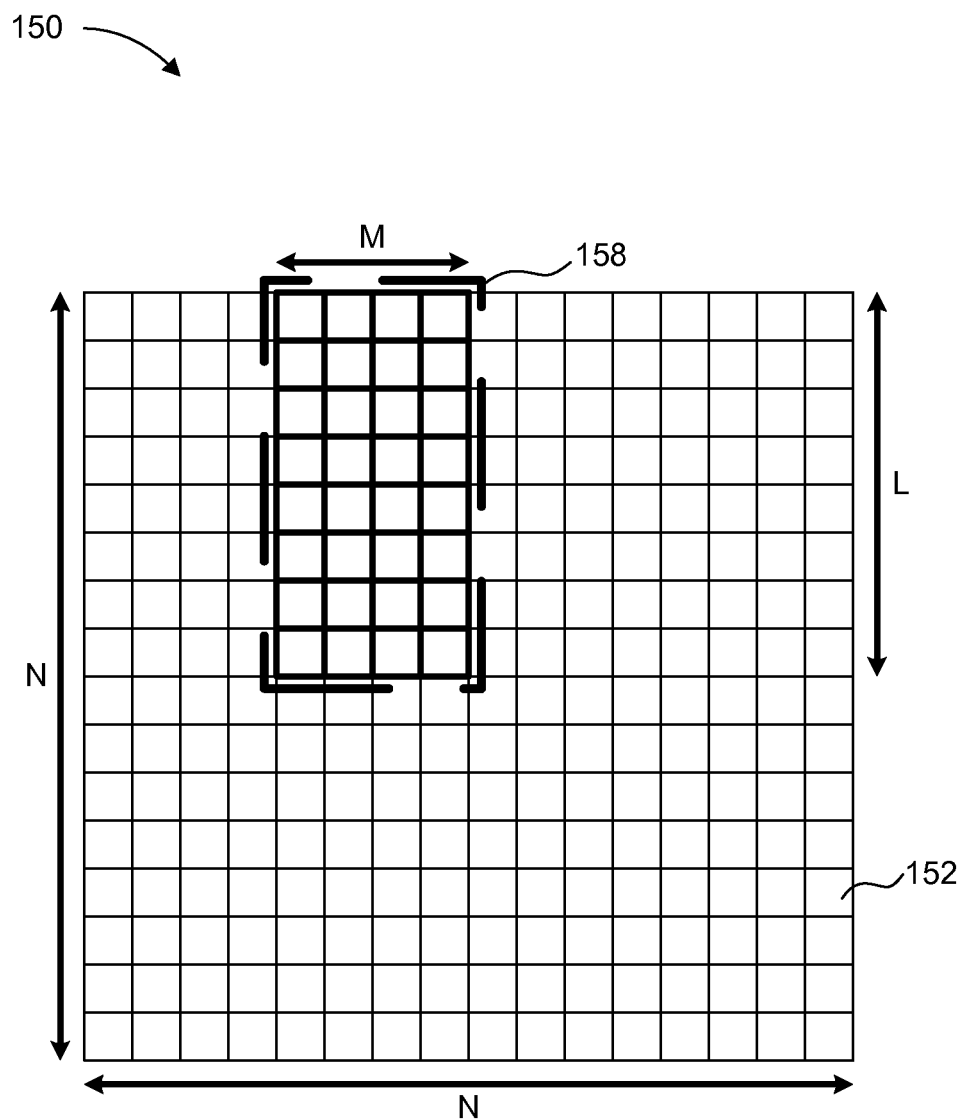
FIG. 6 depicts a schematic diagram of another embodiment of a pixel array to show cropping.
Figure 7:
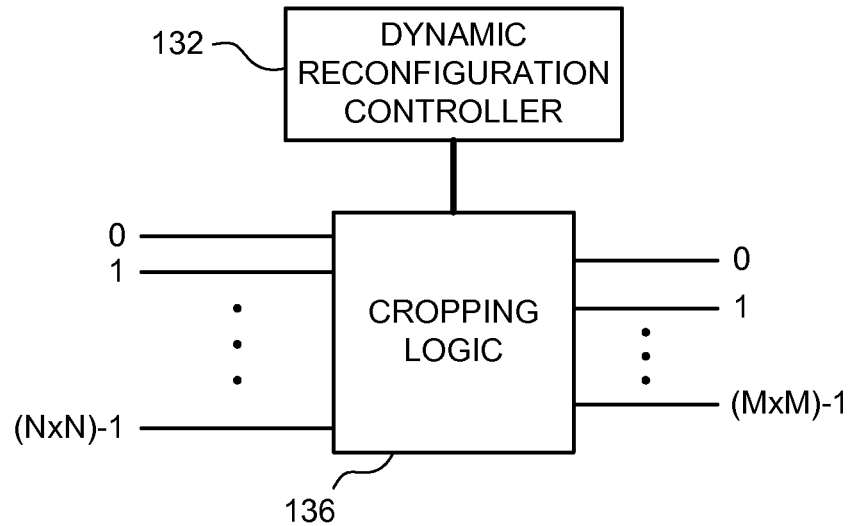
FIG. 7 depicts a schematic block diagram of one embodiment of a pixel cropping architecture.

FIGS. 5-7 illustrate aspects of the cropping mode. In one embodiment, the cropping logic 136 is configured to select a subset of the plurality of electrical signals to generate the plurality of reconfigured electrical signals and to exclude a non-selected subset of the plurality of electrical signals from the plurality of reconfigured electrical signals. In other words, the cropping logic 136 uses an exclusive subset of the original electrical signals to generate the reconfigured electrical signals.

FIG. 5 depicts a schematic diagram of one embodiment of a pixel array to show cropping. In the illustrated embodiment, an M×M subset 156 of the N×N pixel array 150 is selected. The remaining pixels 152 are excluded, or cropped, from the selected subset 156. The electrical signals of the pixels 152 within the subset 156 are then used as the reconfigured electrical signals. The electrical signals of the remaining, cropped pixels 152 are not used or included in the reconfigured electrical signals. For example, there are 64 reconfigured electrical signals (i.e., M=8) for the pixel array 150, instead of 256 original electrical signals (i.e., N=16).

FIG. 6 depicts a schematic diagram of another embodiment of a pixel array 150 to show cropping. In the illustrated embodiment, an M×L subset 158 of the N×N pixel array 150 is selected. The remaining pixels 152 are cropped from the selected subset 158. The electrical signals of the pixels 152 within the subset 156 are then used as the reconfigured electrical signals. For example, there are 32 electrical signals for the pixel array 150, instead of 256 original electrical signals. It should be noted that the configuration of the subsets 156 and 158 are not the same. Hence, the cropping logic 136 may use various subsets of the pixel array 150, and the subsets may be any shape or arrangement, including continuous (i.e., selected pixels 152 are adjacent one another) and non-continuous (i.e., at least some of the selected pixels 152 are not adjacent to other selected pixels) configurations.

This type of cropping (or binning) may be useful in applications for tracking motion where the motion is known to occur predominantly in one direction. For example, a printer head moves predominately in the horizontal direction, and so a tracking motion sensor may use more pixels along a horizontal dimension than along a vertical dimension.

FIG. 7 depicts a schematic block diagram of one embodiment of a pixel cropping architecture. The dynamic reconfiguration controller 132 is coupled to the cropping logic 136 to control the implementation of the cropping mode. The cropping logic 136 receives N×N electrical signals, where N×N is the number of pixels 152 in the pixel array 150. The cropping logic 136 then selects a subset of the pixels 152 to generate M×M (or M×L) reconfigured electrical signals, where M×M (or M×L) is the number of selected pixels 152.

It should be noted that the cropping mode may reduce the complexity of processing because there are fewer reconfigured electrical signals (e.g., 64) than the number of original electrical signals (e.g., 256). Also, some embodiments of the dynamic reconfiguration controller 132 may implement the cropping mode in combination with another dynamic reconfiguration mode such as the binning mode. Other embodiments of the cropping architecture may have other performance considerations.

Additionally, it should be noted that some embodiments of the dynamic reconfiguration logic 128 facilitate adaptively switching between different dynamic reconfiguration modes. For example, the dynamic reconfiguration logic 128 may facilitate switching between the binning mode and the cropping mode. This may allow a different type of pixel array 126 to be used compared to conventional pixel arrays. For example, a pixel array with smaller pixel pitch may be used because the dynamic reconfiguration logic 128 implements the cropping mode when the navigation surface 104 has small features and implements the binning mode when the navigation surface 104 is dark. It should also be noted that embodiments of dynamically switching between the cropping mode and the binning mode allow the image acquisition system 120 to process the same number of signals regardless of which mode is implemented. When the binning mode is implemented, the size of the bins 154 can be set so that the number of bins 154 is a predetermined number. Then when the cropping mode is implemented, the number of selected pixels 152 can be set to the same number as the number of bins 154 used in the binning mode. This provides the flexibility of switching between the binning and cropping modes, while processing the same number of signals for both modes.

Figure 8:
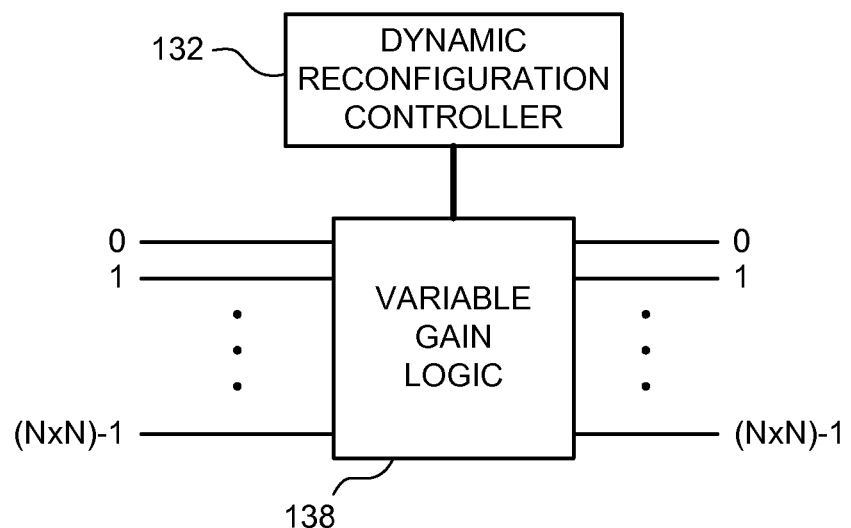
FIG. 8 depicts a schematic block diagram of one embodiment of a variable gain architecture.

FIG. 8 depicts a schematic block diagram of one embodiment of a variable gain architecture. In one embodiment, the variable gain architecture is used to implement the variable gain mode. It should be noted that the variable gain mode does not necessarily affect which pixel signals are used, in contrast to the binning mode and the cropping mode, described above. Therefore, a separate pixel array diagram is not provided in conjunction with this description of the variable gain mode. In one embodiment, the variable gain logic 138 provides programmable analog gain.

The variable gain architecture includes the dynamic reconfiguration controller 132 and the variable gain logic 138. The dynamic reconfiguration controller 132 is coupled to the variable gain logic 138 to control the implementation of the variable gain mode. In one embodiment, the variable gain logic 138 is configured to vary an analog gain of at least one of the plurality of electrical signals to generate the plurality of reconfigured electrical signals. Since the number of signals used is not changed, the variable gain logic 138 has the same number of inputs and outputs. However, at least some of the reconfigured electrical signals output from the variable gain logic 138 are different from the electrical signals input to the variable gain logic 138 because the gain of one or more signals is modified to increase or decrease the strength of the corresponding signals.

It should be noted that the variable gain mode may allow the image sensor 126 to use shorter shutter times and faster frame rates, which in turn allows the image sensor 126 to resolve features on a darker navigation surface 104. Additionally, the dynamic reconfiguration controller 132 may implement the variable gain mode in combination with another dynamic reconfiguration mode such as the binning mode or the cropping mode. Other embodiments of the variable gain architecture may have other performance considerations.

Figure 9:
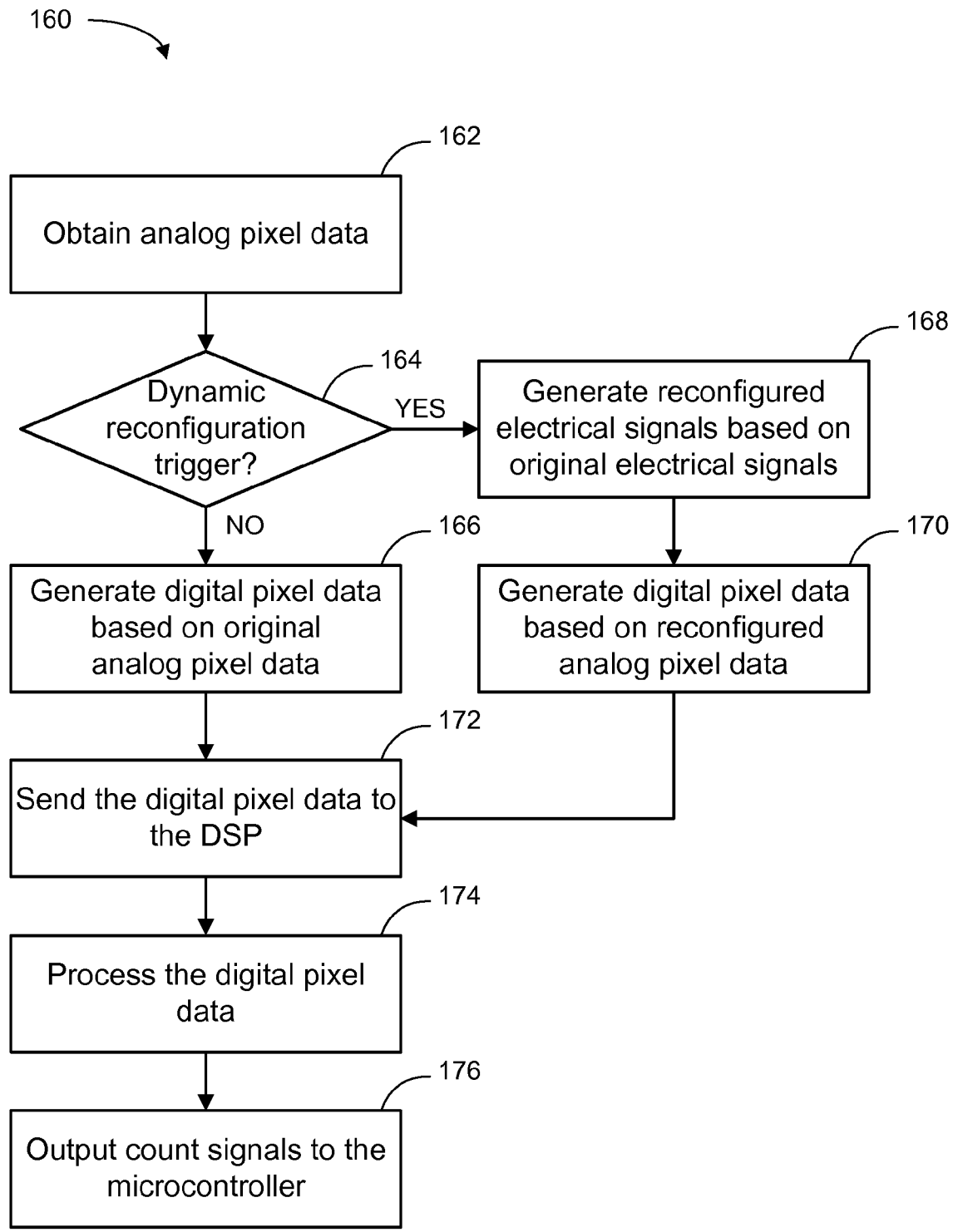
FIG. 9 depicts a flow chart diagram of one embodiment of a dynamic reconfiguration method for dynamically reconfiguring a pixel array.

FIG. 9 depicts a flow chart diagram of one embodiment of a dynamic reconfiguration method 160 for dynamically reconfiguring a pixel array 126. Although references are made to the optical navigation system 100 of FIG. 1, embodiments of the dynamic reconfiguration method 160 may be implemented in conjunction with other types of optical navigation systems.

At block 162, the image acquisition system 120 obtains analog pixel data. In one embodiment, the image sensor 126 receives incident light at the pixel array 126, which integrates an array of corresponding electrical signals. The electrical signals are then transmitted to the dynamic reconfiguration logic 128. At block 164, the dynamic reconfiguration logic 128 determines if there is a dynamic reconfiguration trigger. In one embodiment, the trigger logic 140 of the dynamic reconfiguration logic 128 analyzes the plurality of electrical signals to determine whether to generate a dynamic reconfiguration trigger. In one embodiment, the trigger logic 140 generates the dynamic reconfiguration trigger, as described above. Alternatively, the digital signal processor 122 may generate the dynamic reconfiguration trigger.

If a dynamic reconfiguration trigger is not generated, then at block 166 the dynamic reconfiguration logic 128 passes the original electrical signals to the analog-to-digital converter 130, which generates digital pixel data based on the original analog pixel data. Otherwise, if a dynamic reconfiguration trigger is generated, then at block 168 the dynamic reconfiguration logic generates a plurality of reconfigured electrical signals based on the plurality of electrical signals from the pixel array 126. The dynamic reconfiguration logic 128 then sends the reconfigured electrical signals to the analog-to-digital converter 130. At block 170, the analog-to-digital converter 130 generates digital pixel data based on the reconfigured analog pixel data.

After converting either the original electrical signals or the reconfigured electrical signals from analog signals to digital signals, then at block 172 the analog-to-digital converter 130 sends the digital pixel data to the digital signal processor 122. At block 174 the digital signal processor 122 processes the digital pixel data. In one embodiment, the digital signal processor 122 processes the digital pixel data to identify a movement of the optical navigation device 100 relative to the navigation surface 104. The digital signal processor 122 then outputs count signals such as the channel quadrature signals based on $\Delta x$ and $\Delta y$ relative displacement values, or other signals, to the microcontroller 110. The depicted dynamic reconfiguration method 160 then ends.

It should be noted that the operation 168 to generate the reconfigured electrical signals may be implemented in various ways. In one embodiment, the reconfigured electrical signals may be generated using binned signals by combining subsets of the plurality of electrical signals. In another embodiment, the reconfigured electrical signals may be generated using cropped signals by selecting a subset of the plurality of electrical signals and excluding a non-selected subset of the plurality of electrical signals from the plurality of reconfigured electrical signals. In another embodiment, the reconfigured electrical signals may be generated using variable gain signals by varying the analog gain of the plurality of electrical signals. Other embodiments may use other types of signals to generate the reconfigured electrical signals.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation circuit of an optical navigation device, the optical navigation circuit comprising:
   an image sensor comprising a pixel array to generate a plurality of electrical signals corresponding to incident light at the pixel array;
   dynamic reconfiguration logic coupled to the image sensor, the dynamic reconfiguration logic to receive the plurality of electrical signals from the pixel array and to generate a plurality of reconfigured electrical signals based on the plurality of electrical signals from the pixel array according to a dynamic reconfiguration mode that is different from a standard mode; and
   a digital signal processor coupled to the dynamic reconfiguration logic, the digital signal processor to receive the plurality of reconfigured electrical signals from the dynamic reconfiguration logic;
   wherein the dynamic reconfiguration logic is further configured to generate the reconfigured electrical signals in response to a dynamic reconfiguration trigger;
   wherein the dynamic reconfiguration logic comprises trigger logic to generate the dynamic reconfiguration trigger;
   wherein the dynamic reconfiguration trigger comprises a binning trigger and the trigger logic is further configured to generate the binning trigger based on at least one indicator of the following indicators:
   a first pixel statistics indicator associated with a pixel mean;
   a second pixel statistics indicator associated with a pixel maximum;
   a third pixel statistics indicator associated with a pixel histogram;
   a smoothness indicator to indicate motion tracking smoothness of the optical navigation device; and
   an image autocorrelation indicator to indicate a pattern repetition of a surface.

2. The optical navigation circuit of claim 1 wherein the dynamic reconfiguration trigger comprises a cropping trigger and the trigger logic is further configured to generate the cropping trigger based on at least one indicator of the following indicators:
   a time indicator to indicate a processing time of a motion computation;
   a smoothness indicator to indicate motion tracking smoothness of the optical navigation device; and
   an image autocorrelation indicator to indicate a pattern repetition of a surface.

3. The optical navigation circuit of claim 1 wherein the dynamic reconfiguration trigger comprises a variable gain trigger and the trigger logic is further configured to generate the variable gain trigger based on at least one indicator of the following indicators:
   a first pixel statistics indicator associated with a pixel mean;
   a second pixel statistics indicator associated with a pixel maximum;

a third pixel statistics indicator associated with a pixel histogram; and
an image feature indicator to indicate an image feature count, wherein the optical navigation circuit further comprises a bandpass filter to generate the image feature indicator.

4. The optical navigation circuit of claim 1 wherein the digital signal processor is further configured to generate the dynamic reconfiguration trigger and to send the dynamic reconfiguration trigger to the dynamic reconfiguration logic.

5. The optical navigation circuit of claim 1 wherein the dynamic reconfiguration logic comprises a dynamic reconfiguration controller to implement the dynamic reconfiguration mode.

6. The optical navigation circuit of claim 5 wherein the dynamic reconfiguration logic further comprises binning logic coupled to the dynamic reconfiguration controller, the binning logic to combine subsets of the plurality of electrical signals to generate the plurality of reconfigured electrical signals, wherein the number of reconfigured electrical signals is equal to the number of subsets.

7. The optical navigation circuit of claim 6 wherein the binning logic is further configured to dynamically adjust a binning factor representative of a number of pixels with each of the subsets.

8. The optical navigation circuit of claim 5 wherein the dynamic reconfiguration logic further comprises cropping logic coupled to the dynamic reconfiguration controller, the cropping logic to select a subset of the plurality of electrical signals to generate the plurality of reconfigured electrical signals and to exclude a non-selected subset of the plurality of electrical signals from the plurality of reconfigured electrical signals.

9. The optical navigation circuit of claim 5 wherein the dynamic reconfiguration logic further comprises variable gain logic coupled to the dynamic reconfiguration controller, the variable gain logic to vary an analog gain of at least one of the plurality of electrical signals to generate the plurality of reconfigured electrical signals.

10. The optical navigation circuit of claim 5 wherein the dynamic reconfiguration controller is further configured to adaptively switch between different dynamic reconfiguration modes.

11. A dynamic reconfiguration method for a pixel array of an optical navigation device, the dynamic reconfiguration method comprising:
receiving incident light at the pixel array to generate a plurality of electrical signals;
analyzing the plurality of electrical signals to determine whether to generate a dynamic reconfiguration trigger;
generating a plurality of reconfigured electrical signals in response to generation of the dynamic reconfiguration trigger, wherein the plurality of reconfigured electrical signals is based on the plurality of electrical signals from the pixel array according to a dynamic reconfiguration mode that is different from a standard mode; and
processing the reconfigured electrical signals to identify a movement of the optical navigation device;
wherein generating the plurality of reconfigured electrical signals comprises generating binned signals by combining subsets of the plurality of electrical signals, wherein the number of reconfigured electrical signals is equal to the number of subsets.

12. The dynamic reconfiguration method of claim 11 wherein generating the plurality of reconfigured electrical signals comprises generating cropped signals by selecting a subset of the plurality of electrical signals and excluding a non-selected subset of the plurality of electrical signals from the plurality of reconfigured electrical signals.

13. The dynamic reconfiguration method of claim 11 wherein generating the plurality of reconfigured electrical signals comprises generating variable gain signals by varying the analog gain of the plurality of electrical signals.

14. An apparatus, comprising:
means for generating a dynamic reconfiguration trigger based on an analysis of a plurality of electrical signals from a pixel array of an optical navigational device;
means for generating a plurality of reconfigured electrical signals in response to the dynamic reconfiguration trigger, wherein the plurality of reconfigured electrical signals is based on the plurality of electrical signals from the pixel array according to a dynamic reconfiguration mode that is different from a standard mode; and
means for processing the reconfigured electrical signals to identify a movement of the optical navigation device;
wherein the means for generating the plurality of reconfigured electrical signals further comprises:
means for generating a plurality of binned signals, wherein each of the plurality of binned signals is derived from a combination of a subset of the plurality of electrical signals;
means for generating a plurality of cropped signals, wherein each of the plurality of cropped signals comprises a corresponding one of the plurality of electrical signals, wherein the plurality of cropped signals includes less than all of the plurality of electrical signals; and
means for generating a plurality of variable gain signals, wherein each of the plurality of variable gain signals comprises a corresponding one of the plurality of electrical signals modified by a selected gain.

15. The apparatus of claim 14 wherein the means for generating the dynamic reconfiguration trigger further comprises means for generating the dynamic reconfiguration trigger based on at least one indicator of the following indicators:
a first pixel statistics indicator associated with a pixel mean;
a second pixel statistics indicator associated with a pixel maximum;
a third pixel statistics indicator associated with a pixel histogram;
a smoothness indicator to indicate motion tracking smoothness of the optical navigation device;
an image autocorrelation indicator to indicate a pattern repetition of a surface;
a time indicator to indicate a processing time of a motion computation; and
an image feature indicator to indicate an image feature count.

16. An optical navigation circuit of an optical navigation device, the optical navigation circuit comprising:
an image sensor comprising a pixel array to generate a plurality of electrical signals corresponding to incident light at the pixel array;
dynamic reconfiguration logic coupled to the image sensor, the dynamic reconfiguration logic to receive the plurality of electrical signals from the pixel array and to generate a plurality of reconfigured electrical signals based on the plurality of electrical signals from the pixel array according to a dynamic reconfiguration mode that is different from a standard mode; and
a digital signal processor coupled to the dynamic reconfiguration logic, the digital signal processor to receive the plurality of reconfigured electrical signals from the dynamic reconfiguration logic;

wherein the dynamic reconfiguration logic is further configured to generate the reconfigured electrical signals in response to a dynamic reconfiguration trigger;

wherein the dynamic reconfiguration logic comprises trigger logic to generate the dynamic reconfiguration trigger;

wherein the dynamic reconfiguration trigger comprises a cropping trigger and the trigger logic is further configured to generate the cropping trigger based on at least one indicator of the following indicators:

a time indicator to indicate a processing time of a motion computation;

a smoothness indicator to indicate motion tracking smoothness of the optical navigation device; and an image autocorrelation indicator to indicate a pattern repetition of a surface.

17. An optical navigation circuit of an optical navigation device, the optical navigation circuit comprising:

an image sensor comprising a pixel array to generate a plurality of electrical signals corresponding to incident light at the pixel array;

dynamic reconfiguration logic coupled to the image sensor, the dynamic reconfiguration logic to receive the plurality of electrical signals from the pixel array and to generate a plurality of reconfigured electrical signals based on the plurality of electrical signals from the pixel array according to a dynamic reconfiguration mode that is different from a standard mode; and a digital signal processor coupled to the dynamic reconfiguration logic, the digital signal processor to receive the plurality of reconfigured electrical signals from the dynamic reconfiguration logic;

wherein the dynamic reconfiguration logic is further configured to generate the reconfigured electrical signals in response to a dynamic reconfiguration trigger;

wherein the dynamic reconfiguration logic comprises trigger logic to generate the dynamic reconfiguration trigger;

wherein the dynamic reconfiguration trigger comprises a variable gain trigger and the trigger logic is further configured to generate the variable gain trigger based on at least one indicator of the following indicators:

a first pixel statistics indicator associated with a pixel mean;

a second pixel statistics indicator associated with a pixel maximum;

a third pixel statistics indicator associated with a pixel histogram; and an image feature indicator to indicate an image feature count, wherein the optical navigation circuit further comprises a bandpass filter to generate the image feature indicator.

18. An optical navigation circuit of an optical navigation device, the optical navigation circuit comprising:

an image sensor comprising a pixel array to generate a plurality of electrical signals corresponding to incident light at the pixel array;

dynamic reconfiguration logic coupled to the image sensor, the dynamic reconfiguration logic to receive the plurality of electrical signals from the pixel array and to generate a plurality of reconfigured electrical signals based on the plurality of electrical signals from the pixel array according to a dynamic reconfiguration mode that is different from a standard mode; and a digital signal processor coupled to the dynamic reconfiguration logic, the digital signal processor to receive the plurality of reconfigured electrical signals from the dynamic reconfiguration logic;

wherein the dynamic reconfiguration logic comprises a dynamic reconfiguration controller to implement the dynamic reconfiguration mode;

wherein the dynamic reconfiguration logic further comprises binning logic coupled to the dynamic reconfiguration controller, the binning logic to combine subsets of the plurality of electrical signals to generate the plurality of reconfigured electrical signals, wherein the number of reconfigured electrical signals is equal to the number of subsets.

19. The optical navigation circuit of claim 18 wherein the binning logic is further configured to dynamically adjust a binning factor representative of a number of pixels with each of the subsets.

20. An optical navigation circuit of an optical navigation device, the optical navigation circuit comprising:

an image sensor comprising a pixel array to generate a plurality of electrical signals corresponding to incident light at the pixel array;

dynamic reconfiguration logic coupled to the image sensor, the dynamic reconfiguration logic to receive the plurality of electrical signals from the pixel array and to generate a plurality of reconfigured electrical signals based on the plurality of electrical signals from the pixel array according to a dynamic reconfiguration mode that is different from a standard mode; and a digital signal processor coupled to the dynamic reconfiguration logic, the digital signal processor to receive the plurality of reconfigured electrical signals from the dynamic reconfiguration logic;

wherein the dynamic reconfiguration logic comprises a dynamic reconfiguration controller to implement the dynamic reconfiguration mode;

wherein the dynamic reconfiguration logic further comprises cropping logic coupled to the dynamic reconfiguration controller, the cropping logic to select a subset of the plurality of electrical signals to generate the plurality of reconfigured electrical signals and to exclude a non-selected subset of the plurality of electrical signals from the plurality of reconfigured electrical signals.

21. An optical navigation circuit of an optical navigation device, the optical navigation circuit comprising:

an image sensor comprising a pixel array to generate a plurality of electrical signals corresponding to incident light at the pixel array;

dynamic reconfiguration logic coupled to the image sensor, the dynamic reconfiguration logic to receive the plurality of electrical signals from the pixel array and to generate a plurality of reconfigured electrical signals based on the plurality of electrical signals from the pixel array according to a dynamic reconfiguration mode that is different from a standard mode; and a digital signal processor coupled to the dynamic reconfiguration logic, the digital signal processor to receive the plurality of reconfigured electrical signals from the dynamic reconfiguration logic;

wherein the dynamic reconfiguration logic comprises a dynamic reconfiguration controller to implement the dynamic reconfiguration mode;

wherein the dynamic reconfiguration logic further comprises variable gain logic coupled to the dynamic reconfiguration controller, the variable gain logic to vary an analog gain of at least one of the plurality of electrical signals to generate the plurality of reconfigured electrical signals.

22. A dynamic reconfiguration method for a pixel array of an optical navigation device, the dynamic reconfiguration method comprising:

receiving incident light at the pixel array to generate a plurality of electrical signals;

analyzing the plurality of electrical signals to determine whether to generate a dynamic reconfiguration trigger;

generating a plurality of reconfigured electrical signals in response to generation of the dynamic reconfiguration trigger, wherein the plurality of reconfigured electrical signals is based on the plurality of electrical signals from the pixel array according to a dynamic reconfiguration mode that is different from a standard mode; and processing the reconfigured electrical signals to identify a movement of the optical navigation device;

wherein generating the plurality of reconfigured electrical signals comprises generating cropped signals by selecting a subset of the plurality of electrical signals and excluding a non-selected subset of the plurality of electrical signals from the plurality of reconfigured electrical signals.

23. A dynamic reconfiguration method for a pixel array of an optical navigation device, the dynamic reconfiguration method comprising:

receiving incident light at the pixel array to generate a plurality of electrical signals;

analyzing the plurality of electrical signals to determine whether to generate a dynamic reconfiguration trigger;

generating a plurality of reconfigured electrical signals in response to generation of the dynamic reconfiguration trigger, wherein the plurality of reconfigured electrical signals is based on the plurality of electrical signals from the pixel array according to a dynamic reconfiguration mode that is different from a standard mode; and processing the reconfigured electrical signals to identify a movement of the optical navigation device;

wherein generating the plurality of reconfigured electrical signals comprises generating variable gain signals by varying the analog gain of the plurality of electrical signals.

\* \* \* \* \*